United States Patent
Leonczuk et al.

(10) Patent No.: US 6,987,900 B2
(45) Date of Patent: Jan. 17, 2006

(54) OPTICALLY POWERED OPTICALLY CONTROLLED OPTICAL SWITCH

(75) Inventors: Tomasz Leonczuk, San Jose, CA (US); Samuel Chang, Redwood City, CA (US); Krzysztof Pradzynski, Santa Clara, CA (US); Charles Barker, Sunnyvale, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 10/894,320

(22) Filed: Jul. 19, 2004

(65) Prior Publication Data

US 2004/0264843 A1    Dec. 30, 2004

Related U.S. Application Data

(63) Continuation of application No. 10/100,332, filed on Mar. 18, 2002, now Pat. No. 6,816,639.

(51) Int. Cl.
    *G02B 6/28*      (2006.01)
(52) U.S. Cl. .............................. 385/16; 385/15; 385/24
(58) Field of Classification Search ................. 385/15, 385/16, 17, 18, 24, 88, 92
See application file for complete search history.

(56) References Cited

U.S. PATENT DOCUMENTS

| | | | | |
|---|---|---|---|---|
| 5,177,628 A | * | 1/1993 | Moddel | 349/28 |
| 5,317,198 A | | 5/1994 | Husbands | 307/116 |
| 5,714,773 A | | 2/1998 | Burrows et al. | 257/82 |
| 5,726,788 A | * | 3/1998 | Fee et al. | 398/180 |
| 5,739,933 A | | 4/1998 | Dembeck et al. | 359/117 |
| 5,747,526 A | | 5/1998 | Hollinshead | 514/448 |
| 5,859,719 A | | 1/1999 | Dentai et al. | 359/171 |
| 5,889,610 A | | 3/1999 | Fatechi et al. | 359/341 |
| 6,088,497 A | * | 7/2000 | Phillips et al. | 385/48 |
| 6,154,587 A | | 11/2000 | Okayama | 385/24 |
| 6,229,932 B1 | * | 5/2001 | Fukashiro et al. | 385/16 |
| 6,411,751 B1 | | 6/2002 | Giles et al. | 385/16 |
| 6,430,335 B1 | * | 8/2002 | Carberry et al. | 385/20 |
| 6,563,979 B2 | * | 5/2003 | Feinberg et al. | 385/24 |

(Continued)

FOREIGN PATENT DOCUMENTS

EP      1 026 839      8/2000

(Continued)

OTHER PUBLICATIONS

International Search Report for PCT/US03/08172, mailed Sep. 23, 2003.

(Continued)

Primary Examiner—Brian M. Healy
(74) Attorney, Agent, or Firm—John Bruckner PC

(57) ABSTRACT

Systems and methods are described for optically powered optically controlled optical switches. A method includes powering an optical switch with a communications data signal; and controlling the optical switch with the communications data signal. An apparatus includes a primary optical input port; a secondary optical input port; an optical tap coupled to the primary optical input port; an optical switch coupled to the optical tap and to the secondary optical input port; an optical-to-electrical signal converter coupled to the optical tap; a control circuit coupled to the optical-to-electrical signal converter and to the optical switch; an electrical energy storage circuit coupled to the control circuit; an optical-to-electrical power converter coupled to the electrical energy storage circuit and to the optical switch; and an optical output port coupled to the optical switch, wherein the optical-to-electrical signal converter can transform, to electrical energy, optical energy from a communications data signal that arrives at the optical tap.

5 Claims, 2 Drawing Sheets

U.S. PATENT DOCUMENTS

| | | | |
|---|---|---|---|
| 6,580,530 B1 * | 6/2003 | Arecco et al. ................. | 398/5 |
| 6,597,826 B1 | 7/2003 | Ramaswami et al. ......... | 385/17 |
| 6,816,639 B1 * | 11/2004 | Leonczuk et al. ............ | 385/16 |

FOREIGN PATENT DOCUMENTS

| | | |
|---|---|---|
| JP | 58 139538 | 8/1983 |
| WO | WO 00/77932 | 12/2000 |

OTHER PUBLICATIONS

Banwell, et al. "Powering the Fiber Loop Optically—A Cost Analysis" Journal of Lightwave Technology, IEEE, vol. 11, No. 3, Mar. 1, 1993, pp. 481-494.

Liu Y et al. "Optically Powered Optical Interconnect" Optical Fiber Communication Conference, Houston, Feb. 6-9, 1989, Washington, IEEE Comp. Soc. Press., US vol. CONF. 12.

Govindaragan, et al. "Optically Powered Optoelectronic Switch with Polarization Routing", IEEE Photonics Technology Letters, vol. 3, No. 7, Jul. 1991, pp. 669-672.

Yairi, et al. "Optically-Controlled Optical Gate Using a Double Diode Structure", Ginzton Laboratory, Stanford University, Nov. 1999, 2 pages.

Bishop, et al. "Silicon micromechanics takes on light-wave networks", The Industrial Physicist, Sep. 1998, pp. 39-41.

* cited by examiner

OPTICALLY POWERED OPTICALLY CONTROLLED OPTICAL SWITCH

CROSS-REFERENCE TO RELATED APPLICATION

This application is a continuation of, and claims a benefit of priority under 35 U.S.C. 120 from utility patent application U.S. Ser. No. 10/100,332, filed Mar. 18, 2002, now U.S. Pat. No. 6,816,639 issued Nov. 9, 2004 the entire contents of which are hereby expressly incorporated herein by reference for all purposes.

BACKGROUND OF THE INVENTION

1. Field of the Invention

The invention relates generally to the field of optical networks. More particularly, the invention relates to optical switches. Specifically, a preferred implementation of the invention relates to optically powered and controlled optical switches.

2. Discussion of the Related Art

Optical switches are fundamental building blocks of optical networks, allowing the redirection of optical signals from one optical path or waveguide to another. These switches have been traditionally used with fiber optics technology, and are usually suitable for a wide range of applications, including: add and drop multiplexing systems, signal monitoring, automated measurement and adjustment systems, automated test systems and network fault protection.

Commercially available switches often include features such as: low insertion loss, low polarization dependence loss, good repeatability, hermetic sealing and latching mechanisms (which ensure the switch status remains unchanged during power failure). Other features of commercially available switches can include: low crosstalk levels, fast switching time, low switching power and a wide range of operating temperature, among others.

A problem with this technology is that optical switches need to be powered by a separate entity or entities in a network. The switching function requires power. Another problem with this technology is that optical switches must be controlled by other separate entity or entities in the network. The state of the switch requires control. Therefore these problems limit the deployment of optical switches to specific locations in the optical network.

Heretofore, the requirements of powering and controlling optical switches in a most efficient manner have not been fully met. What is needed is a solution that simultaneously addresses these requirements.

SUMMARY OF THE INVENTION

There is a need for the following aspects of the invention. Of course, the invention is not limited to these aspects.

According to an aspect of the invention, a method comprises: powering an optical switch with a communications data signal; and controlling the optical switch with the communications data signal. According to another aspect of the invention, an apparatus comprises: a primary optical input port; a secondary optical input port; an optical tap coupled to the primary optical input port; an optical switch coupled to the optical tap and to the secondary optical input port; an optical-to-electrical signal converter coupled to the optical tap; a control circuit coupled to the optical-to-electrical signal converter and to the optical switch; an electrical energy storage circuit coupled to the control circuit; an optical-to-electrical power converter coupled to the electrical energy storage circuit and to the optical switch; and an optical output port coupled to the optical switch, wherein the optical-to-electrical signal converter can transform, to electrical energy, optical energy from a communications data signal that arrives at the optical tap.

These, and other embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The context of the invention can include optical links and/or networks. The context of the invention can include robust optical links and/or networks where auto switching to a redundant back-up is implemented. The context of the invention can also include an optically-controlled, optically-powered optical switching module.

An optically powered and controlled optical switch is fully self-contained and can thus be located virtually anywhere in an optical network. Optical switches are fundamental building blocks of optical networks, allowing the redirection of optical signals from one optical path (e.g., waveguide) to another. The invention can include a method and/or apparatus for an optically-controlled, optically-powered switch. The switch can compose an optical switching module (OPOSM). The switch can include two optical input ports through which all data signals, power and control passes. It is important to appreciate that the data signals themselves can be the power and control services. Because the optical switching module can be optically powered and optically controlled from the data signals, it is fully self-contained and can thus be deployed virtually anywhere in an optical network. The invention does not need separate power and/or control connections. Further, the invention does not need separate power and/or control channels, bands and/or spectrum apart from the data signals themselves. The switch state of the OPOSM can be controlled automatically by the presence or absence of an optical signal on a primary optical input port.

One of the functions of the OPOSM can include passing either a primary or a secondary input optical signal to an output port, depending on whether or not a primary optical signal is present at the primary input part. In a preferred embodiment, the OPOSM can perform the switching function automatically upon detection of the loss or restoration of the primary optical signal. The power required by the OPOSM can be drawn from the optical signals incident on the input ports.

Figure 1:
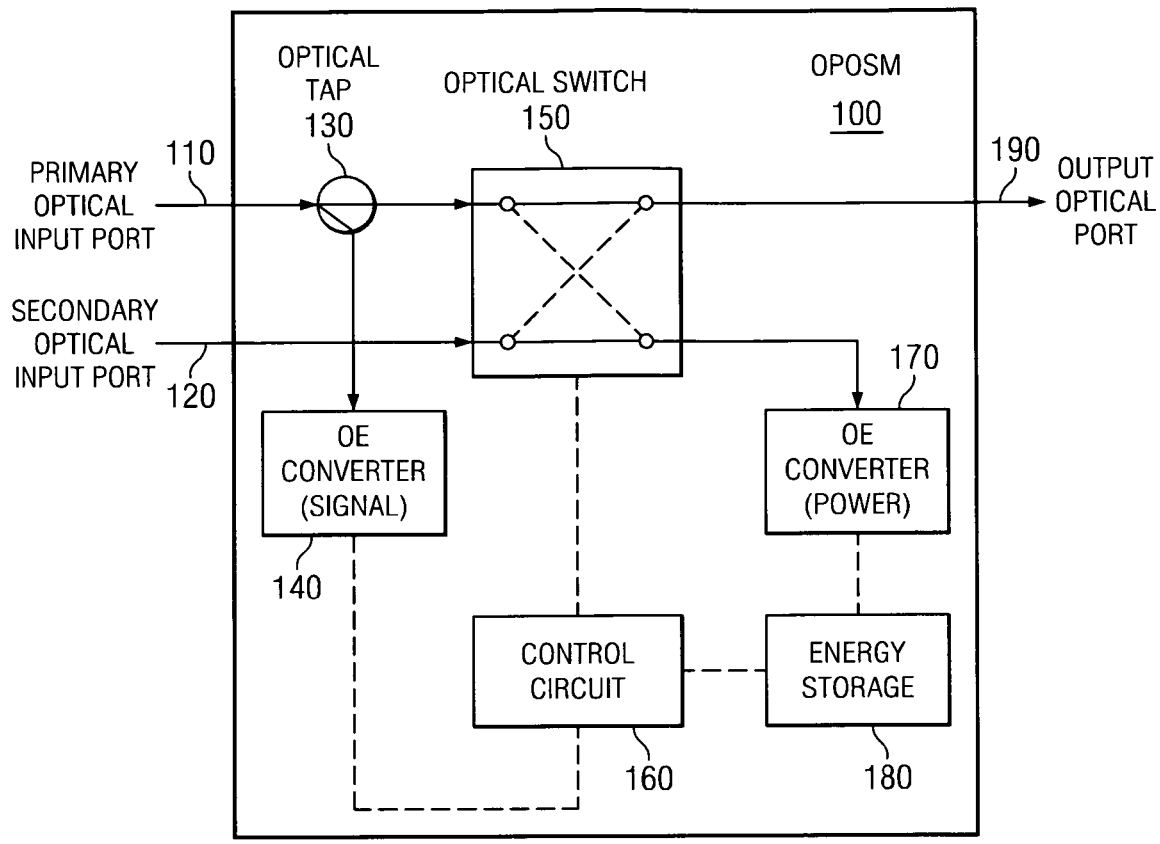
FIG. 1 illustrates a block diagram of an optically-controlled, optically-powered optical switch module (OPOSM), representing an embodiment of the invention.

Referring to FIG. 1, a block diagram of an optically-controlled, optically-powered optical switch module 100 (OPOSM) is depicted. A primary optical input port 110 is optically coupled to an optical tap 130. The optical tap 130 is optically coupled to an optical switch 150 and to an optical-to-electrical signal converter 140. A secondary optical input port 120 is optically coupled to the optical switch 150. The optical-to-electrical signal converter 140 is coupled to a control circuit 160. The control circuit 160 is coupled to the optical switch 150 and to an electrical energy storage circuit 180. The electrical energy storage circuit 180 is coupled to another optical-to-electrical power converter 170. The optical-to-electrical power converter 170 is optically coupled to the optical switch 150. An optical output port 190 is coupled to the optical switch 150.

Still referring to FIG. 1, the OPOSM 100 includes the primary optical input port 110 and the secondary optical input port 120, upon which a primary optical input signal and a secondary optical input signal may be incident, respectively. The optical input ports 110 and 120 are connected to the inputs of the optical switch 150, which can be a 2×2, self-latching optical cross-bar switch. One of the outputs of the optical switch 150 is connected to the optical output port 190 of the OPOSM 100. The other output of the optical switch 150 is directed to the optical-to-electrical power converter 170, which in turn can supply electrical current to the energy storage circuit 180.

Still referring to FIG. 1, the energy storage circuit 180 can supply electrical power to the control circuit 160. The optical tap 130 can be placed on the primary optical input port 110. The optical tap 130 can split off a small portion of the primary optical input signal and direct it to the optical-to-electrical signal converter 140. The optical-to-electrical signal converter 140 can provide an electrical signal to the control circuit 160, indicating the presence or absence of the primary optical input signal. The control circuit 160 can control the state of the optical switch 150 based upon the presence or absence of the primary optical input signal.

Still referring to FIG. 1, the OPOSM 100 may have two operating states or configurations, including a primary operating state and a secondary operating state. In the primary operating state, both the primary optical input signal and the secondary optical input signal are present on their respective optical input ports 110, 120. The optical switch 150 can direct the primary optical input signal to the optical output port 190, and the secondary optical input signal to the optical-to-electrical power converter 170. The optical-to-electrical power converter 170 can convert the optical power from the secondary input signal to an electrical current which may be used to charge the electrical energy storage circuit 180.

Still referring to FIG. 1, the secondary operating state may be enabled when the optical-to-electrical signal converter 140 detects that the primary optical input signal has fallen below a pre-determined threshold value. When this condition occurs, the control circuit 160 may cause the optical switch 150 to change its state in order to direct the secondary optical input signal to the optical output port 190. When and if the primary optical input signal power level is restored, its power is used by the optical-to-electrical power converter 170 to charge the electrical energy storage circuit 180 in preparation for returning the optical switch 150 to its primary state. The use of a self-latching switch allows the module to continue routing the secondary even if the primary is not restored.

Still referring to FIG. 1, upon completion of the charging of the electrical energy storage circuit 180 and upon detection of the presence of optical power on the primary optical input port 110 by the optical-to-electrical signal converter 140, the control circuit 160 may cause the optical switch 150 to revert to its primary configuration, as described above. The restoration of the primary optical input signal to the optical output port 190 of the OPOSM 100 can happen automatically upon restoration of the primary optical input signal to the primary optical input port 110 within a time period determined by the charging time of the electrical energy storage circuit 180.

Still referring to FIG. 1, the latching character of the optical switch 150 means that power is not required to maintain either state of the optical switch, but only to change the state of the switch. Although the elements of the OPOSM 100 are depicted in a particular order or configuration, several other configurations can be conceived by one skilled in the art. For example, electrical power may be sourced from optical taps that direct a fraction of the incident primary and/or secondary optical input signals to optical-to-electrical power converters. Such a configuration would allow the use of a 1×2 optical switch.

In a preferred embodiment, the invention provides a method and/or apparatus for optically controlling and powering an optical switching module wherein these functions are derived from the primary and secondary (back-up) optical input signals only, obviating the need for additional wavelengths, optical connections, and/or electrical connections. Power and control may be provided by the optical beam that is transporting data or communications traffic, and the optical switching module may appear as a passive element in an optical network. Specifically, the presence of a primary input data signal above a threshold can define a Boolean state variable (control) and a secondary input data signal can be parasitically transformed into an electrical power source. Both of these functions can be provided on the same channel, band and/or spectrum as the data itself.

Figure 2:
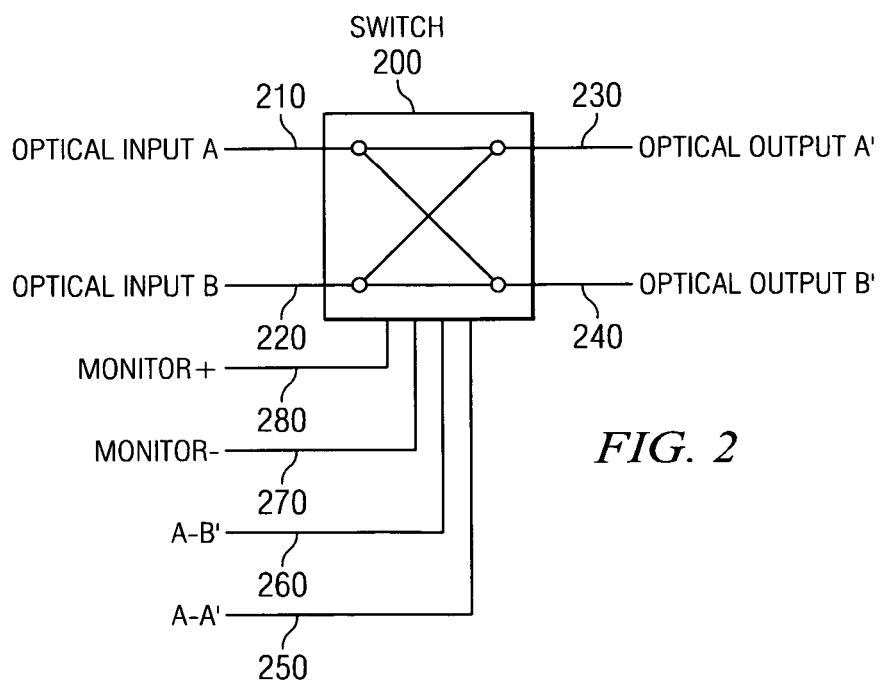
FIG. 2 illustrates a block diagram of an optical switch, representing an embodiment of the invention.

Referring to FIG. 2, a block diagram of an optical switch 200 is depicted. An optical input A 210 and an optical input B 220 are coupled to the optical switch 200. An optical output A' 230 and an optical output B' 240 are coupled to the optical switch 200. An A–A' control line 250 is coupled to the optical switch 200. The A–A' line when energized can cause the switch to change from cross to bar. An A–B' control line 260 is coupled to the optical switch 200. The A–B' line when energized can cause the switch to change from bar to cross. A monitor– port 270 is coupled to the optical switch 200. A monitor+ port 280 is coupled to the optical switch 200.

Figure 3:
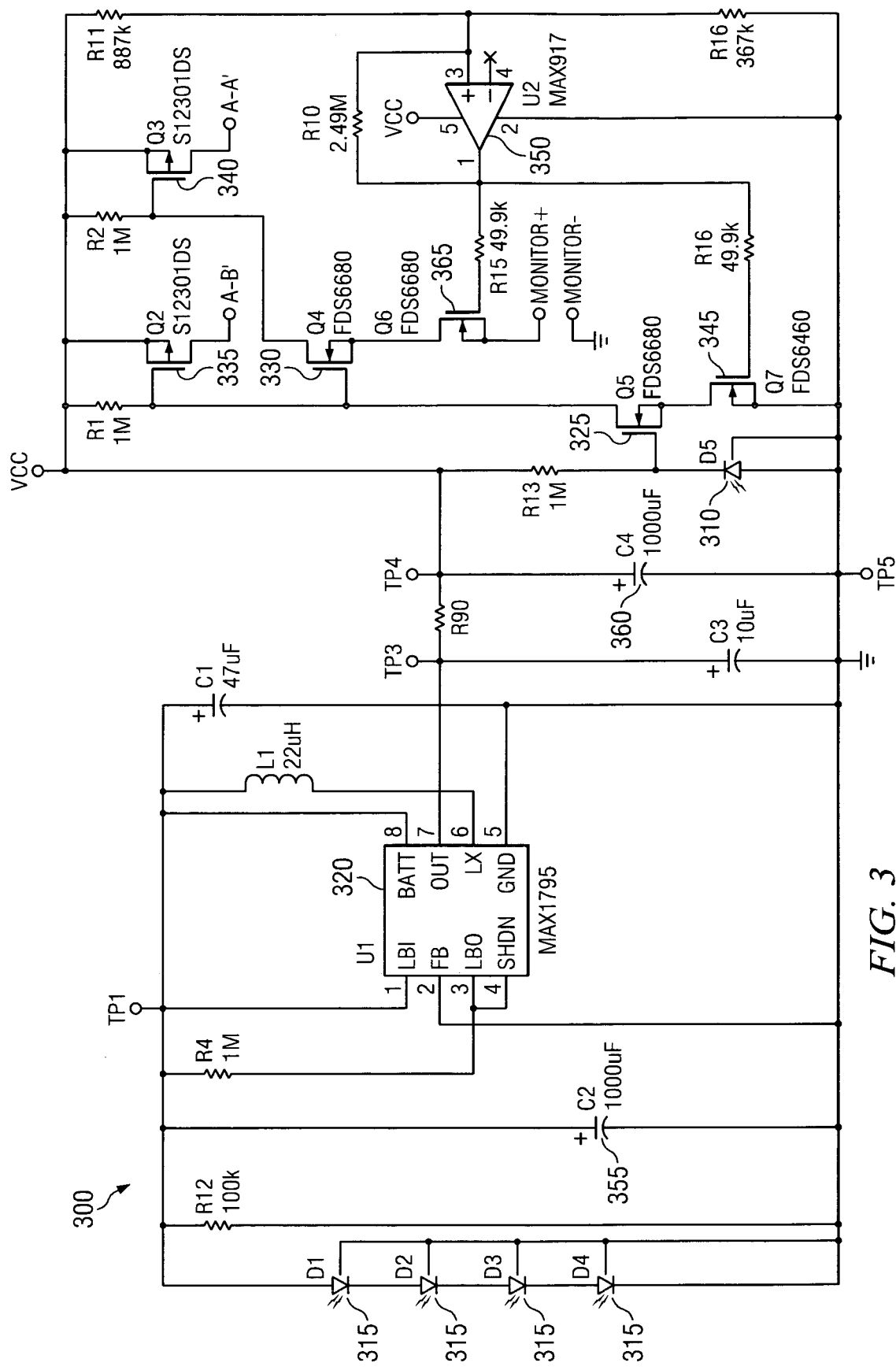
FIG. 3 illustrates a circuit diagram of an implementation of an optically-controlled, optically-powered optical switch module (OPOSM), representing an embodiment of the invention.

Referring to FIG. 3, a circuit diagram of an implementation of an optically-controlled, optically-powered optical switch module 300 (OPOSM) is depicted. In a preferred embodiment, the optically-controlled, optically-powered optical switch module 300 can be used in conjunction with an optical switch as depicted in FIG. 2 which may be, for example, a 2×2 crossbar switch such as the Santec model OSW-20-2×2 optical switch.

Referring to FIGS. 2–3, the primary optical input signal is applied to the optical input A 210, after passing through an optical tap coupler that can direct a small fraction of the incident optical signal to a photodiode D5 310. A secondary optical input signal may be applied to the optical input B 220.

Referring to FIGS. 1–3, the optical output A' 230 may be the optical output port 190 of the OPOSM 100. The optical output B' 240 can be directed through a 1×4 optical splitter to a set of photodiodes D1, D2, D3, and D4 315. An optical-to-electrical conversion for power may be performed by the set of photodiodes D1, D2, D3, and D4 315 disposed in the depicted serial arrangement. An integrated circuit U1 320 can include a DC-to-DC converter that steps up a voltage generated across the series combination of the set of photodiodes D1, D2, D3, and D4 315 from <1V to 5V, which may be necessary for operation of the optical switch 200.

Still referring to FIGS. 1–3, in a primary configuration, both the primary and secondary optical input signals are present, and the optical switch 200 is in a bar configuration, which can directly pass the optical input A 210 to the optical output A' 230, and the optical input B 220 to the optical output B' 240. In this bar configuration, the monitor+ port 280 and the monitor– 270 port are open-circuit. In this bar configuration, the photodiode D5 310 is illuminated, which turns a transistor Q5 325 off and thus a transistor Q4 330 on. A transistor Q2 335 is turned off (A–B' off), and a transistor Q3 340 is turned off (A–A' off), preventing a change of the optical switch 200 configuration.

Still referring to FIGS. 1–3, when an optical signal power is lost at the primary optical input port, the photodiode D5 310 is no longer illuminated, causing the transistor Q5 325 to turn on. A transistor Q7 345 is turned on by an integrated circuit U2 350. The integrated circuit U2 350 can include an operational amplifier. With the transistor Q5 325 and the transistor Q7 345 on, the transistor Q2 335 is turned on (A–B' on), delivering power to the A–B' control line 260 on the optical switch 200. This can cause the optical switch 200 to change from the bar configuration to a cross configuration. In the cross configuration, the optical switch 200 can direct the secondary optical input signal applied to the optical input B 220 to the optical output A' 230, and connect the optical input A 210 to the optical output B' 240. In the cross configuration, the monitor+ port 280 and the monitor– port 270 on the optical switch 200 may be short-circuited.

Still referring to FIGS. 1–3, when the primary optical input signal is restored, its power is applied to the set of photodiodes D1, D2, D3, and D4 315, which can charge a capacitor C2 355, and cause the integrated circuit U1 320 to charge a capacitor C4 360. In a preferred embodiment, when the capacitor C4 360 is charged to approximately 4.7 V, the integrated circuit U2 350 turns a transistor Q6 365 on. The primary input optical signal can also illuminate the photodiode D5 310, which can turn the transistor Q5 325 off and the transistor Q4 330 on. With the monitor+ port 280 and the monitor– port 270 short-circuited, and with the transistor Q4 330 and the transistor Q6 365 on, the transistor Q3 340 turns on and applies power to the A–A' control line 250 on the optical switch 200, causing it to return to the bar configuration. This particular implementation is one of many possible implementations, is meant for illustrative purposes only, and is not intended to limit the scope of the invention.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as largely, although not necessarily wholly (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The phrase any integer derivable therein, as used herein, is defined as an integer between the corresponding numbers recited in the specification, and the phrase any range derivable therein is defined as any range within such corresponding numbers. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is an optically controlled and powered optical switch. A practical application of the invention is a self-powered, self-controlled switch, bypass and/or shunt. Further, the invention is useful in conjunction with damage tolerant optical networks, or in conjunction with damage resistant fiber optics networks, or the like. There are virtually innumerable uses for the invention, all of which need not be detailed here.

Advantages of the Invention

An optically powered and controlled optical switch, representing an embodiment of the invention, can be cost effective and advantageous for at least the following reasons. The invention provides a method and/or apparatus for optically controlling and powering an optical switching module wherein these functions are derived from the primary and secondary optical input signals only, obviating the need for separate power and/or control wavelengths and/or connections. The invention is especially advantageous in a damage tolerant or resistant network where obviating the need for separate power and/or control connections further enhances reliability and robustness. The invention does not need separate optical and/or electrical connections. The invention improves quality and/or reduces costs compared to previous approaches.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, although the optically powered and controlled optical switch described herein can be a separate module, it will be manifest that the optically powered and controlled optical switch may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   powering an optical switch with a communications data signal including a primary communication data signal and a secondary communications signal; and
   controlling the optical switch with the communications data signal.

2. The method of claim 1, wherein controlling the optical switch includes controlling the optical switch with the primary communications data signal.

3. The method of claim 1, wherein powering the optical switch includes powering the optical switch with the secondary communications data signal.

4. An optically powered and optically controlled optical switch module, comprising:
   a primary optical input port;
   a secondary optical input port;
   an optical tap coupled to the primary optical input port;
   an optical switch coupled to the optical tap and to the secondary optical input port;
   an optical-to-electrical signal converter coupled to the optical tap;
   a control circuit coupled to the optical-to-electrical signal converter and to the optical switch;
   an electrical energy storage circuit coupled to the control circuit;
   an optical-to-electrical power converter coupled to the electrical energy storage circuit and to the optical switch; and
   an optical output port coupled to the optical switch,
   wherein the optical-to-electrical signal converter can transform, to electrical energy, optical energy from a communications data signal that arrives at the optical tap.

5. A fiber optic network, comprising the an optically powered and optically controlled optical switch module including:
   a primary optical input port;
   a secondary optical input port;
   an optical tap coupled to the primary optical input port;
   an optical switch coupled to the optical tap and to the secondary optical input port;
   an optical-to-electrical signal converter coupled to the optical tap;
   a control circuit coupled to the optical-to-electrical signal converter and to the optical switch;
   an electrical energy storage circuit coupled to the control circuit;
   an optical-to-electrical power converter coupled to the electrical energy storage circuit and to the optical switch; and
   an optical output port coupled to the optical switch,
   wherein the optical-to-electrical signal converter can transform, to electrical energy, optical energy from a communications data signal that arrives at the optical tap.

* * * * *